Figure 1:
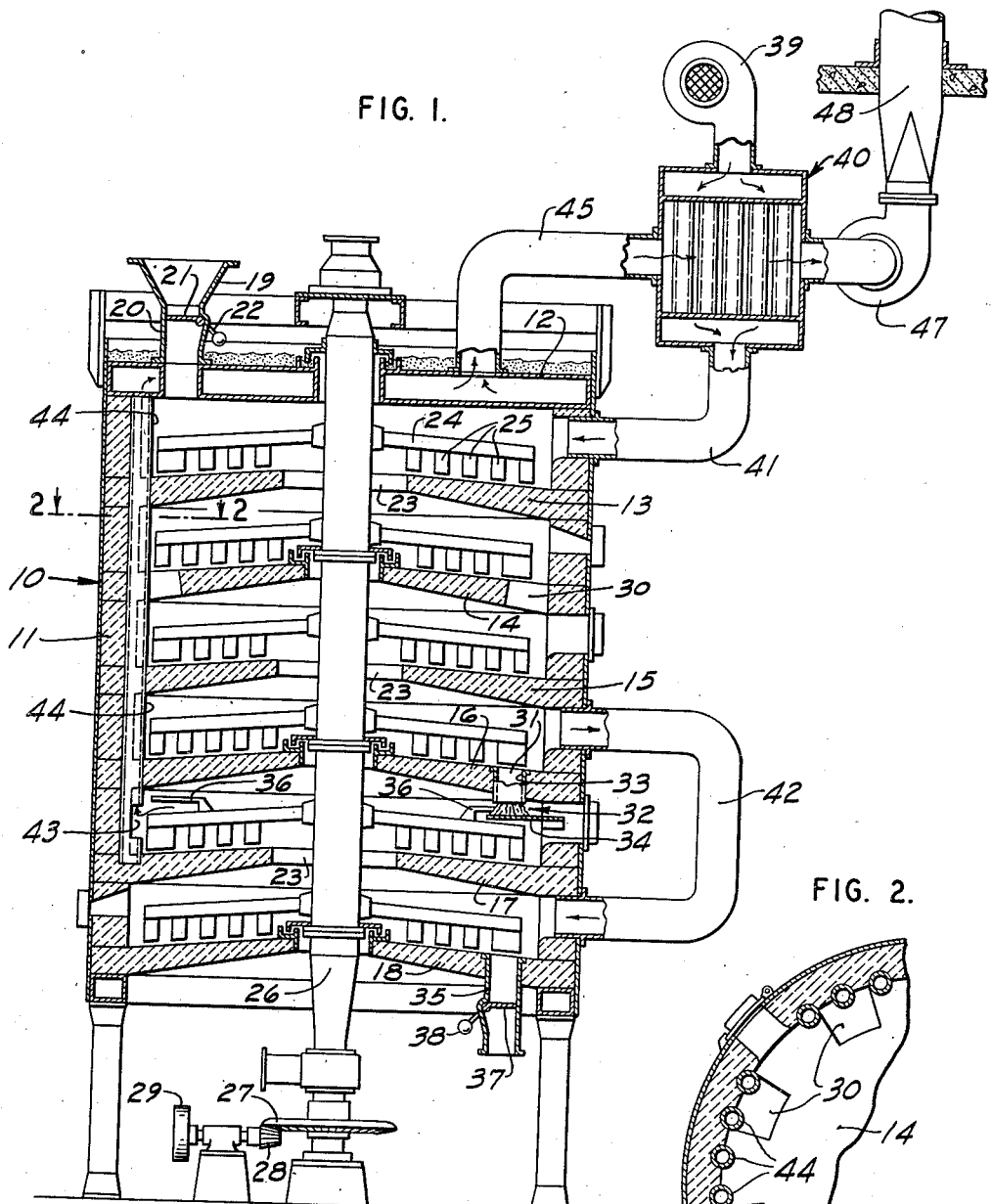

July 5, 1938.  W. RAISCH  2,122,492

INCINERATION

Filed Nov. 10, 1936

INVENTOR
WILLIAM RAISCH
BY *Louis L. Ansart*
his ATTORNEY

Patented July 5, 1938

2,122,492

UNITED STATES PATENT OFFICE 2,122,492

INCINERATION

William Raisch, New York, N. Y., assignor to Underpinning & Foundation Co., Inc., New York, N. Y., a corporation of New York Application November 10, 1936, Serial No. 110,033

6 Claims. (Cl. 110—12)

This invention relates to incineration and more particularly to improvements in tiered multiple-hearth furnaces for drying and burning material of high moisture or volatile content by passing it downwardly through a plurality of zones or compartments, gradually drying it in upper zones and then burning it in lower zones.

Although the apparatus of the present invention is suitable for use with many kinds of material, it is of particular value in drying and burning waste material such as garbage and sewage material including sewage sludge and sewage screenings, both of which have a substantial moisture content.

The principal objects of the invention are to provide novel, advantageous and effective forms of apparatus for treatment of material of the general character specified. Another object of the invention relates to an improvement in a tiered multiple-hearth furnace divided into separate drying and burning sections by an intermediate hearth, whereby the hot gases of combustion pass from the burning section upwardly through the drying section in heat exchange ducts arranged at the inner surface of the peripheral wall of the furnace.

In carrying out the invention, use is made of a tiered multiple-hearth furnace in which one of the intermediate hearths is provided with a gas seal to divide the furnace into an upper drying section and a lower burning section. In a furnace of this kind, the material introduced at the top is worked downwardly from hearth to hearth through central outlets for every other hearth and peripheral outlets for the remaining hearths and material on the hearths is agitated and moved towards the outlet of said hearths by suitable rabbling devices. Air preferably preheated by heat exchange with the discharge gases of combustion is introduced into the upper part of the drying section and passed downwardly along the path followed by the solid material under treatment. From the lower part of the drying section the air laden with vapors of moisture and volatile material taken up from the material under treatment is passed to the lower part of the burning section, the air furnishing oxygen for combustion, the vapors being treated so as to remove any noxious odors which may have been picked up in connection with the drying operation.

From the upper part of the burning section, the hot gases of combustion are drawn off through tubes or ducts extending upwardly through the hearths of the drying section and discharging into a hollow metal top of the furnace. From the top of the furnace the gases of combustion may be passed through a heat exchanger utilized in preheating the air supplied to the drying section. The tubes or ducts by which the hot gases are carried up to the hollow top are located at the inner surface of the peripheral wall of the furnace and serve as heat exchangers between the hot gases therein and the gases and other material at the interior of the drying section. The hollow top may also be of suitable heat conducting material such as cast iron or steel and may be insulated from the outside air by suitable insulating material placed on the top thereof.

Figure 2:
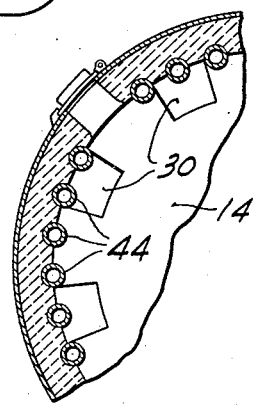

Further objects, features and advantages will appear upon consideration of the following description and of the drawing in which:

Fig. 1 is a view in vertical section of a preferred embodiment of the apparatus of the present invention; and Fig. 2 is a section taken on the line 2—2 of Fig. 1.

Referring to the drawing, there is disclosed an apparatus including a multiple hearth furnace 10 having a peripheral wall 11, a hollow top 12 and hearths 13, 14, 15, 16, 17 and 18, of which the hearth 18 serves as the bottom of the furnace. Material may be supplied at the top of the furnace by means of a hopper 19 and a chute 20 extending through the hollow top 12, the chute being provided with a gas seal which may be in the form of a pivoted door or gate 21 normally held in closed position by weighted arm 22.

As herein disclosed, material introduced through the chute 20 passes into the upper compartment of the furnace and falls on the hearth 13 near its periphery. The material thus deposited on the hearth 13 is agitated and moved inwardly to a central outlet 23 by one or more rabbling devices each of which comprises a radial arm 24 and inclined blades 25 extending downwardly therefrom, the arm 24 being supported and actuated by a vertical shaft 26 passing through the central part of the outlet 23. Actuation of the shaft 26 may be effected by means of a bevel gear 27 thereon, a bevel gear 28 meshing with the bevel gear 27 and a pulley 29 connected with the bevel gear 28 and actuated from any suitable source of power.

The shaft 26 is provided above each of the hearths 14, 15, 16, 17 and 18 with rabbling devices similar to those above the hearth 13, but above the hearths 14, 16 and 18, the blades are inclined in the opposite direction so as to work the material to peripheral outlets. The hearth 14 is shown as provided with two outlets designated by reference numeral 30, the hearth 16 is provided with one outlet 31 which is provided with a gas seal 32 including a tube 33 in the outlet 31 and extending downwardly to within a short distance of a platform 34 on which the material passing downwardly through the outlet 31 piles up and maintains the tube 33 closed, and the hearth 18 is provided with a single outlet in the form of a chute 35. Feeding of the material downwardly through this gas seal to the hearth 17 may be effected by sweeps or sweep arms 36 which remove at each revolution some of the material from the shelf or platform 34 and allow other material to settle down through the tube or chute 33. The hearths 15 and 17 are provided with central outlets 23 corresponding to that in the hearth 13. The discharge chute 35 at the periphery of the hearth 18 is sealed against the passage of gas by means of a gate or door 37 normally held in closed position by a weighted arm 38.

By means of a fan 39 air is forced through a heat exchanger 40 for preheating and is then passed through a duct 41 to the uppermost compartment of the drying section. The preheated air thus introduced passes downwardly through the drying section concurrently with movement of the solid material through this section and, in a slightly cooled condition and laden with vapor of moisture and volatile material, passes from the lowermost compartment of the drying section through a duct 42 into the lowermost compartment of the burning section where the air aids combustion and any noxious odors in the vapors are eliminated due to the high temperatures.

From the uppermost compartment of the burning section the hot gases of combustion pass through lateral inlets 43 into tubes 44 extending upwardly through the hearths of the drying section and at the inner surface of the peripheral wall 11 to the hollow top 12 of the furnace. The tubes 44 are of suitable heat resisting material also adapted for heat exchange between the hot gases at the interior of these tubes and the air and gases at the interior of the drying section. It will be seen that the bottom wall of the hollow top 12 also serves as a heat exchanging wall between the top and the uppermost compartment of the drying section. From the hollow top 12, the hot gases may pass through a duct 45 to the hot side of the heat exchanger 40 where part of the heat contained in the combustion gases is transferred to the air passing through the duct 41 to the uppermost chamber of the dryer. The draft through the furnace and various ducts may be induced by a fan 47 which draws the hot gases through the heat exchanger 40 and discharged them to a stack 48.

It should be understood that the number of hearths in the burning section may be increased or diminished as desired and that the same is true as to the drying section.

The operation has been brought out clearly in the foregoing description.

It should be understood that various changes may be made and that certain features may be used without others, without departing from the true scope and spirit of the invention.

Having thus described my invention, I claim:

1. The combination with a multiple-hearth furnace comprising a peripheral wall, a hollow top with a lower heat-exchanging wall, a plurality of vertically spaced hearths setting off compartments below said top, outlets for said hearths alternately at the centers and peripheries of successive hearths, a gas seal for one of said hearths to divide the furnace into an upper drying section and a lower burning section, means for supplying preheated air to the upper part of the drying section, and means for passing air and vapors from the lower part of said drying section to the burning section, of means for passing hot gases of combustion from the burning section upwardly to the hollow top along the inner surface of said peripheral wall in heat exchange relationship with the interior of the drying section, and induced draft means drawing said hot gases from said hollow top and into heat exchanging relationship with said air supplied to the upper part of the drying section.

2. The combination with a multiple-hearth furnace comprising a peripheral wall, a plurality of vertically spaced hearths dividing the furnace into compartments, outlets for said hearths alternately at the centers and peripheries of successive hearths, a gas seal for one of said hearths to divide the furnace into an upper drying section and a lower burning section, means for supplying preheated air to the upper part of the drying section, and means for passing air and vapors from the lower part of said drying section to the burning section, of a heat exchanger extending across the uppermost compartment, means for conducting hot gases of combustion from the burning section upwardly to said heat exchanger along the inner surface of said peripheral wall in heat exchange relationship with the interior of the drying section, and means for drawing said hot gases from said heat exchanger and discharging them from the furnace.

3. The combination with a multiple-hearth furnace comprising a peripheral wall, a top, a plurality of vertically spaced hearths setting off compartments below said top, outlets for said hearths alternately at the centers and peripheries of successive hearths, a gas seal for one of said hearths to divide the furnace into an upper drying section and a lower burning section, means for supplying preheated air to the upper part of the drying section, and means for passing air and vapors from the lower part of said drying section to the burning section, of a plurality of heat-exchange ducts extending from the burning section upwardly to the top along the inner surface of said peripheral wall in heat exchange relationship with the interior of the drying section, and induced draft means drawing said hot gases from said ducts and into heat exchanging relationship with said air supplied to the upper part of the drying section.

4. The combination with a multiple-hearth furnace comprising a peripheral wall, a hollow top with a lower heat-exchanging wall, a plurality of vertically spaced hearths setting off compartments below said top, outlets for said hearths alternately at the centers and peripheries of successive hearths, a gas seal for one of said hearths to divide the furnace into an upper drying section and a lower burning section, means for supplying preheated air to the upper part of the drying section, and means for passing air and vapors from the lower part of said drying section to the burning section, of a plurality of heat-exchange ducts for passing hot gases of combustion from the burning section upwardly to the hollow top along the inner surface of said peripheral wall in heat exchange relationship with the interior of the drying section, and induced draft means drawing said hot gases from said hollow top and into heat exchanging relationship with said air supplied to the upper part of the drying section.

5. The combination with a multiple-hearth furnace comprising a peripheral wall, a hollow top with a lower heat-exchanging wall, a plurality of vertically spaced hearths setting off compartments below said top, outlets for said hearths alternately at the centers and peripheries of successive hearths, a gas seal for one of said hearths to divide the furnace into an upper drying section and a lower burning section, means for supplying preheated air to the upper part of the drying section, and means for passing air and vapors from the lower part of said drying section to the lower part of the burning section, of means for passing hot gases of combustion from the upper part of the burning section upwardly to the hollow top along the inner surface of said peripheral wall in heat exchange relationship with the interior of the drying section, and induced draft means drawing said hot gases from said hollow top and into heat exchanging relationship with said air supplied to the upper part of the drying section.

6. The combination with a multiple-hearth furnace comprising a peripheral wall, a plurality of vertically spaced hearths dividing the furnace into compartments, outlets for said hearths alternately at the centers and peripheries of successive hearths to enable the material to pass downwardly from hearth to hearth, a gas seal for one of said hearths to divide the furnace into an upper drying section and a lower burning section and means for passing air and vapors from the lower part of said drying section to the burning section, of a heat exchanger at the top of the uppermost compartment, a second heat exchanger outside of the furnace, means for conducting hot gases of combustion from the burning section upwardly along the inner side of said peripheral wall in heat exchange relationship with the interior of the drying section and through the higher temperature portions of the two heat exchangers, and means for passing air through the lower temperature part of the second heat exchanger and into the uppermost compartment of the furnace.

WILLIAM RAISCH.